United States Patent
Hyakutome et al.

(10) Patent No.: US 6,539,179 B2
(45) Date of Patent: Mar. 25, 2003

(54) PHOTO-FILM UNIT MASKING MATERIAL AND PHOTO-FILM UNIT

(75) Inventors: Masumi Hyakutome, Tokyo-to (JP); Minoru Ono, Minamiashigara (JP)

(73) Assignees: Dai Nippon Printing Co., LTD, Tokyo-to (JP); Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/932,772

(22) Filed: Aug. 17, 2001

(65) Prior Publication Data

US 2002/0041762 A1 Apr. 11, 2002

(30) Foreign Application Priority Data

Aug. 24, 2000 (JP) .......................... 2000-253791
May 22, 2001 (JP) .......................... 2001-152305

(51) Int. Cl.[7] .............................................. G03B 17/24
(52) U.S. Cl. .......................... 396/313; 430/207; 430/259
(58) Field of Search .................................. 396/313, 517, 396/528; 430/199, 207, 210, 259, 263

(56) References Cited

U.S. PATENT DOCUMENTS 4,668,602 A * 5/1987 Hosaka et al. .............. 430/207

* cited by examiner

Primary Examiner—David M. Gray
(74) Attorney, Agent, or Firm—Ladas & Parry (57) ABSTRACT

The present invention provides a masking material and a photo-film unit which exhibit writability for any of the presently used writing materials including a ballpoint pen, an oily pen, an aqueous pen, a fountain pen and a pencil, are water-resistant, are free from blocking, and permit complete erasion of pencil writing with a rubber. A writability imparting layer comprising vinylpyrrolidone-vinyl acetate copolymer, an acrylic resin having a hydrophilic group, and powder is provided on a support film of a photo-film unit or a masking material.

8 Claims, 6 Drawing Sheets

PHOTO-FILM UNIT MASKING MATERIAL AND PHOTO-FILM UNIT

BACKGROUND OF THE INVENTION

1. Field of the Invention

The present invention relates to the area of photo-film units. More particularly, the invention relates to a masking material for a photo-film unit having a writable area, and a photo-film unit having a writable non-image portion provided on the surface on the image viewing side, using the above-mentioned masking material.

2. Description of the Related Art

There has conventionally been known a mono-sheet type instant photo-film unit. About ten sheets of this film unit are housed one on top of the other in a cartridge and set in a photographing equipment such as a camera. Immediately after photographing, the units are released one by one from the photographing equipment through a pair of rollers. Upon passing between the rollers, a pod provided on each film unit is broken. The developing solution contained in the pod is dispersed over a photosensitive layer for development, thus giving a photo. According to the mono-sheet type instant photo-film unit, it is not necessary to carry out stripping operation after the completion of development. The mono-sheet type instant photo is described in detail in the U.S. Pat. Nos. 3,415,644 and 3,954,476, and Japanese Unexamined Patent Publications Nos. 50-153628 and 48-43317, and is typically represented by Spectra System of Polaroid Corporation, and ACE System and Instax System of Fuji Photo Film Co., Ltd.

Mono-sheet type instant photos are broadly classified into a type (used in Spectra System) having a structure in which a positive photosensitive material sheet and a negative photosensitive material sheet are placed one on top of the other as separate supports into a lamination, and a post-shooting developing solution (having temporarily light shielding property, and then becoming white) can be injected between the sheets, and another type (used in ACE or Instax) having a structure in which a positive photosensitive material and a negative photosensitive material are held on the same support, and a post-shooting developing solution (having a light shielding property) can be injected between a cover sheet and the thus formed combined layer.

The latter type is further divided into an outside mask type (Instax) in which a mask material serving as a frame determining an image forming area of a photo is located outside (above) the photosensitive material, and an inside mask type (ACE) in which a masking material is located inside (below) the photosensitive layer. The type in which the positive photosensitive material and the negative photosensitive material are on separate supports is based on the outside masking method in principle.

In any of the several above-mentioned types of mono-sheet type instant photos, a complete image is available on the spot, providing a remarkable advantage of convenience. Furthermore, it would be very convenient if the user can fill in on the spot information about the object of photo, the date of shooting, the photographer, a message and other supplemental information on the resultant photo, it is the usual practice to retain an area in an photo-film unit imparted writability in a non-image portion on the image viewing side.

In general, in order to impart writability to the non-image portion, a mat material such as silica dispersed in a non-polarity binder is coated onto a polymer film supporting the non-image portion. By thus forming a mat layer on the non-image portion, writability with a ballpoint pen or a pencil can be provided, but with an aqueous writing material, ink is repelled, and writability is denied to this extent.

Trials to impart an excellent writability including aqueous writing material include a method of coating a mat material dispersed in a hydrophilic resin such as polyvinyl alcohol or gelatine onto the support of the non-image portion is disclosed in Japanese Unexamined Patent Publication No. 55-17124. In this method, however, when water drops drop onto the writability imparting layer or the layer is dipped into water, a problem is caused in that writability of the portion in contact with water is reduced or even disappears.

As means to solve this problem, Japanese Unexamined Patent Publication No. 57-152949 discloses a method of providing a writability imparting layer comprising a saponification product of a porous ethylene-vinyl acetate copolymer having a rough surface on a plastic film. However, the writability imparting layer available from this method has fine pores throughout the length and breadth. Because, after writing with an aqueous writing material, blurs occur before the layer is dried up, this method is not suitable for writing fine characters with an aqueous writing material. While pencil-writability is satisfactory, a low rubber erasability of pencil-written images is a problem.

SUMMARY OF THE INVENTION

The present invention was developed in view of the aforementioned problems, and has a first object to provide a method of imparting writability to a photo-film unit for any of the commonly used writing materials such as a ballpoint pen, an oily pen, an aqueous pen, a fountain pen and a pencil.

A second object of the invention is to provide a writability imparting layer which exhibits excellent writability for all the commonly used writing materials, is water-resistant, and permits complete erasion of pencil writing with an eraser without the risk of blocking.

To achieve the aforementioned objects, the invention provides a mask material for a photo-film unit having a writability imparting layer comprising vinylpyrrolidone-vinyl acetate copolymer, an acryl resin having a hydrophilic group, and a powder as an outermost surface layer formed on a support film.

This writability imparting layer has no blurs or patchiness even when using an aqueous writing material or a fountain pen under the effect of hygroscopicity of the vinylpyrrolidone-vinyl acetate copolymer, and exhibits satisfactory writability. The writability imparting layer ensures impartation of water resistance without impairing hygroscopicity of vinylpyrrolidone-vinyl acetate copolymer by the addition of an acrylic resin having a hydrophilic group. Pencil-writability is imparted to this writability imparting layer by the addition of powder so as to permit complete erasion of even pencil writing. This writability imparting layer is hardly susceptible to blocking.

In a preferred embodiment, the photo-film unit masking material of the invention has a writable area comprising at least a lamination of a primer layer a), a white layer b), and as an outermost surface layer c) the aforementioned writability imparting layer formed in this sequence on the aforementioned support film. In another preferred embodiment of the photo-film unit masking material of the invention, the primer layer a) comprises a hardened (cured) composition containing acrylpolyol, vinyl chloride-vinyl acetate copolymer, polyfunctional isocyanate, and a white pigment. In another preferred embodiment of the photo-film unit masking material of the invention, the white layer b) comprises a hardened (cured) composition containing urethane, polyfunctional isocyanate and a white pigment. In still another preferred embodiment of the photo-film unit masking material of the invention, a white layer b') comprises a hardened (cured) composition containing urethane, acrylpolyol, vinyl chloride-vinyl acetate copolymer, polyfunctional isocyanate, and a white pigment.

Furthermore, the invention provides a photo-film having a matting material having the aforementioned writability imparting layer provided on a non-image portion in the same plane as the image portion of the photo-film unit.

In further another preferred embodiment, the photo-film unit of the invention has a writable area comprising at least a primer layer a) comprising a hardened composition containing acrylpolyol, vinyl chloride-vinyl acetate copolymer, polyfunctional isocyanate and a white pigment, a white layer b) comprising a hardened composition containing urethane, polyfunctional isocyanate, or a white layer b') comprising a hardened composition containing urethane, acrylporryol, vinyl chloride-vinyl acetate copolymer, polyfunctional isocyanate and a white pigment, and a writability imparting layer serving as an outermost surface layer c), laminated in this sequence.

In these embodiments, the aforementioned white layer b) or white layer b') containing a white pigment is formed under the writability imparting layer. Because even a thick white layer b) or b') does not cause a curl, it is possible to impart a sufficient white concealing property to the writable area.

The aforementioned white layer b) and white layer b'), while exhibiting a sufficient white concealing property, are low in adhesion to a support film. The above-mentioned primer layer is therefore provided between the support film and the white layer b) or b'). This primer layer, containing a white pigment blended therein, contributes to improvement of white concealing property of the writable area.

The writable area provided in the masking material of the present invention is water-resistant, and exhibits an excellent writability for all the usually used writing materials including a ballpoint pen, an oily pen, an aqueous pen, a fountain pen, and a pencil. Even a pencil writing can be completely erased with a rubber. Using such a masking material, it is possible to manufacture a photo-film unit having a writable non-image portion.

As compared with the white layer composition forming the white layer b), the white layer composition forming the white layer b') additionally contains acrylpolyol and vinyl chloride-vinyl acetate copolymer. Elongation of the white layer b') formed by such a white layer composition is further inhibited. The masking material having such a white layer b') formed thereon has an excellent fabricability and is suitably applicable to a processing process of a photo-film unit, because application of additional tension or the like to the masking material during processing in the manufacture of a photo-film unit further inhibits elongation of the white layer b').

The same writability imparting layer as that of the above-mentioned masking material is provided in the non-image portion of the photo-film unit of the invention, it is water-resistant, shows an excellent writability for all the usually used writing materials such as a ballpoint pen, an oily pen, an aqueous pen, a fountain pen, and a pencil, and permits complete erasion of even pencil writing with a rubber. Since the writable area (area in which the writability imparting layer is formed) portion of the photo-film unit of the invention is hardly susceptible to blocking, a plurality of photo-film units, if housed in a cartridge, can be smoothly drawn out one by one.

DETAILED DESCRIPTION OF THE PREFERRED EMBODIMENTS (1) Photo-film Unit Masking Material The instant photo-film unit masking material provided by the present invention has a writability imparting layer comprising, as an outermost surface layer, vinylpyrrolidone-vinyl acetate copolymer, an acrylic resin having a hydrophilic group, and powder, on a support film.

In a preferred embodiment, a writable area may be provided by laminating, on the support film, at least a) a primer layer comprising a hardened primer layer composition containing acrylpolyol, vinyl chloride-vinyl acetate copolymer, polyfunctional isocyanate, and a white pigment, b) a white layer comprising a hardened white layer composition containing urethane, a polyfunctional isocyanate, and a white pigment, and c) the writability imparting layer serving as an outermost surface layer in this sequence.

In another preferred embodiment, a writable area may be provided, on the support film, by lamination at least a) a primer layer comprising a hardened primer layer composition containing acrylpolyol, vinyl chloride-vinyl acetate copolymer, a polyfunctional isocyanate, and a white pigment, b') a white layer comprising a hardened white layer composition containing urethane, acrylpolyol, vinyl chloride-vinyl acetate copolymer, a polyfunctional isocyanate, and a white pigment, and c) the writability imparting layer serving as the outermost surface layer, in this sequence.

Figure 1:
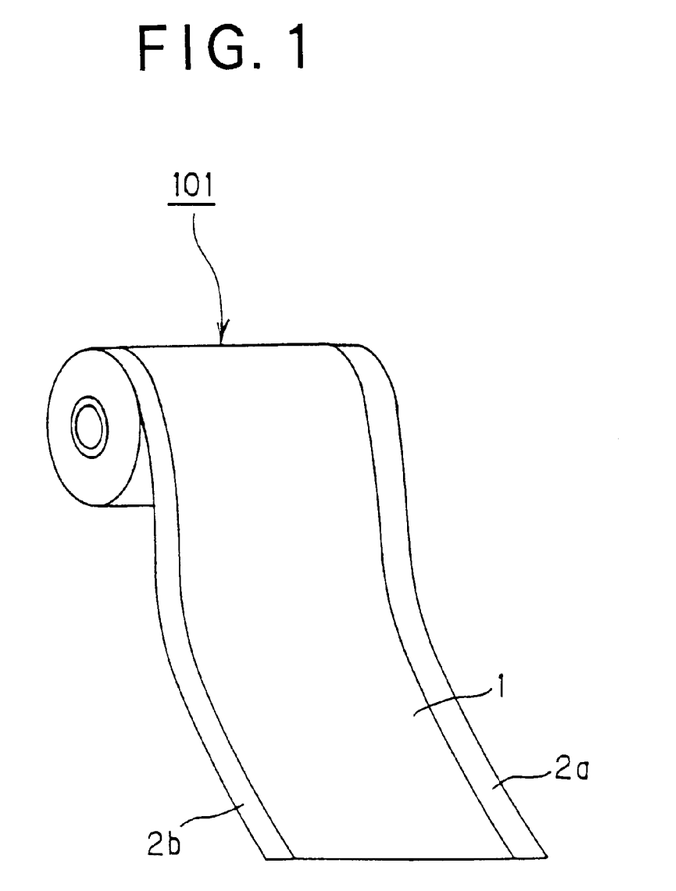
FIG. 1 is a perspective view illustrating an example of the photo-film unit masking material of the present invention.

FIG. 1 illustrates an example (101) of the photo-film unit masking material of the present invention. The masking material 101 is formed in the shape of a long sheet and wound up. The masking material 101 is pulled out from this roll stock, and cut into necessary size and shape for use. The writable area 1 covered with the writability imparting layer is continuously provided in the longitudinal direction on the upper surface of the masking material 101. A printing layer 2a having a slightly larger width is provided along a side edge of the masking material 101. In addition, another printing layer 2b having a slightly narrower width is provided along the other side edge. It is not always necessary to provide the writable area over the entire area of the masking material surface, but it may be provided in only an area. That is, the writable area may be provided only in a portion which becomes the non-image portion required to have writability when used in the manufacture of the photo-film unit.

Figure 2:
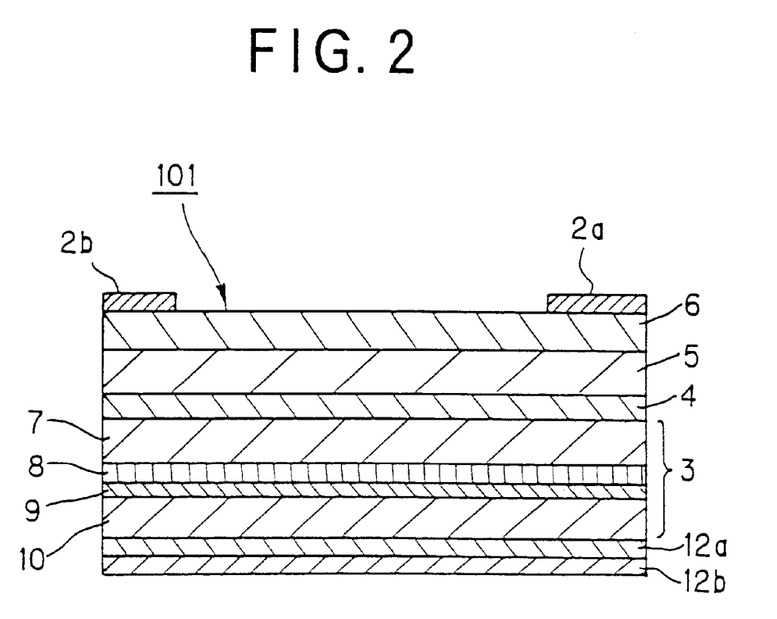
FIG. 2 is a schematic sectional view illustrating an example of the photo-film unit masking material of the invention.

FIG. 2 schematically illustrates a cross-section of the masking material. The masking material 101 has a support film 3. On the surface side of the support film 3, a) a primer layer 4 comprising a hardened primer layer composition containing acrylpolyol, vinyl chloride-vinyl acetate copolymer, a polyfunctional isocyanate, and a white pigment, b) a white layer 5 comprising a hardened white layer composition containing urethane, a polyfunctional isocyanate, and a white pigment, and c) a writability imparting layer 6 comprising vinylpyrrolidone-vinyl acetate copolymer, an acrylic resin having a hydrophilic group, and powder are laminated in this sequence. On the writability imparting layer, a printing layer 2a having a slightly larger width is formed along a side edge of the support film 3, and another printing layer 2b having a slightly narrower width is formed along the other side edge. The outermost surface of the portion not having the printing layers 2 (2a and 2b) has the writability imparting layer 6 formed thereon, thus forming the writable area 1. On the other hand, on the back of the support film 3, a first hot lacquer layer 12a and a second lacquer layer 12b are laminated in this sequence to impart heat sealing property. When sufficient heat sealing property is available from the first hot lacquer layer alone, it is not necessary to coat the second hot lacquer layer over it.

In the invention, it is necessary to form the writability imparting layer c) as an outermost surface layer on the surface side of the support film. It is desirable to laminate the primer layer a), the white layer b) and the writability imparting layer c) in this sequence on the surface side of the support film. Furthermore, any other layers may be provided so far they are not contrary to the object of the invention. For example, printing layers and hot lacquer layers may be provided as in the masking material 101. It is also possible to provide a vapor deposited layer for imparting light shielding property between the support film and the primer layer, or another primer layer also between the white layer and the writability imparting layer.

In the invention, the white layer b') should preferably be formed with a white layer composition containing urethane, acrylpolyol, vinyl chloride-vinyl acetate copolymer, a polyfunctional isocyanate, and a white pigment in place of the white layer b).

This white layer composition permits formation of a white layer b') having a small elongation. When a tension or the like is applied to the masking material in a processing step upon manufacturing the photo-film unit, elongation of the masking material having the white layer b') formed thereon is further inhibited. This masking material is thus suitably applicable to the processing step of the photo-film unit.

(Support Film)

Any support film may be used with no problem so far as it is a film material having a strength and a durability necessary for a masking material. For example, applicable film materials include a plastic film, a sheet of paper, and a metal sheet. Examples of applicable plastics include cellulose esters such as cellulose nitrate, cellulose triacetate, and cellulose diacetate; polystyrene; polyamide; homo- or copolymer of vinyl chloride; polyvinyl acetate; polycarbonate; homo- or copolymer of olefin such as polyethylene or polypropylene; and polyester such as polyethylene terephthalate. Applicable kinds of paper include partially acetylated paper; baryta; and paper available by coating or laminating homo- or copolymer of olefin such as polyethylene and polypropylene on the surface.

The support film may be a composite film. For example, as the masking material shown in FIG. 2, a composite film prepared by affixing a vapor-deposited PET (11) having a metal vapor-deposition layer 9 for imparting light shielding property on a surface of a polyethylene terephthalate film (PET) 10, and another PET (7) with the vapor-deposition layer 9 inside via an adhesive layer 8 may be used as a support film.

The support film has usually a thickness within a range of from 10 to 50 $\mu$m.

(Primer Layer)

A primer layer comprising a hardened primer layer composition containing, as required constituents, acrylpolyol, a vinyl chloride-vinyl acetate copolymer, a polyfunctional isocyanate, and a white pigment is first formed on the surface side of the support film.

The primer layer composition used in the invention, being excellent in adhesion, is suitable for forming a highly adhesive primer layer by coating into a small thickness on the support film. This primer layer composition, containing a white pigment, contributes to improvement of the white concealing property. However, this primer layer composition is susceptible to serious hardening contraction. If it is coated onto the support film into a large thickness, therefore, a curl of the masking material is caused. It is therefore impossible to coat this primer layer composition into such a large thickness that a sufficient white concealing property is available, and it is not applicable by itself for forming the white layer.

Acrylpolyol is an acrylic resin having two or more hydroxyl groups in a molecule, and serves as a main binder for imparting adhesion to the primer layer. More specifically, there is used a polymer of acrylic ester of polyhydric alcohols such as glycerine, trimethylolethane, trimethylolpropane, sorbitol, 1,2,4-butanetriol, 1,2,6-hexanetriol, and pentaerythritol with acrylic acid or methacrylic acid, or a copolymer containing the same. There is no restriction imposed on the molecular weight, which is appropriately selected taking account of the solubility of resin, adhesion to the primer layer, and contraction.

The vinyl chloride-vinyl acetate copolymer is added to the primer layer for imparting dispersibility of the white pigment. A copolymerization ratio of the vinyl chloride-vinyl acetate copolymer is appropriately selected within a range of from 90/10 to 10–90.

The polyfunctional isocyanate is a compound having two or more isocyanates in a molecule, and hardens the primer layer composition through polymerization or polycondensation with the aforementioned acrylpolyol. Any of known aromatic, aliphatic or alicyclic diisocyanates may be used as a polyfunctional isocyanate compound. For example, typically applicable compounds include 1,5-naphthylenediisocyanate, 4,4'-diphenylmethanediisocyanate, 4,4'-diphenyldimethylmethanediisocyanate, 4,4-dibenzylisocyanate, dialkyldiphenylmethanediisocyanate, tetralkyldiphenylmethanediisocyanate, 1,3-phenylenediisocyanate, 1,4-phenylenediisocyanate, trilenediisocyanate, butane-1,4-diisocyanate, hexamethylenediisocyanate, isopropylenediisocyanate, methylenediisocyanate, 2,2,4-trimethylhexamethylenediisocyanate, 2,4,4-trimethylhexamethylenediisocyanate, cyclohexane-1,4-diisocyanate, xylylenediisocyanate, isophoronediisocyanate, lysinediisocyanate, dicyclohexylmethane-4,4'-diisocyanate, 1,3-bis(isocyanatemethyl) cyclohexane, methylcyclohexanediisocyanate, m-tetramethylxylylenediisocyanate, and dimerdiisocyanate formed by inverting carboxyl group in dimer acid into isocyanate group.

The white pigment is used for improving the white concealing property of the background of the writability imparting layer in cooperation of the primer layer with the white layer. Applicable white pigments include, for example, titanium dioxide, zinc white, calcium carbonate, clay (kaolin), and barium sulfate. Among others, titanium dioxide is used as the most typical white pigment.

The primer layer composition is prepared by mixing the aforementioned required constituents, and as required, other constituents. The coating solution for the primer layer composition is prepared usually by placing these constituents in a solvent, preferably in a mixed solvent of methylethyl ketone, ethyl acetate and toluene and dissolving and dispersing them on a beads mill or the like to impart an appropriate coating property. The constituents of the primer layer composition can be mixed, dissolved and dispersed by known methods. There is no particular restriction on primer layer composition of the invention comprising acrylpolyol, vinyl chloride-vinyl acetate copolymer, a polyfunctional isocyanate and a white pigment. However, the blending ratio of the total resin solid content to the white pigment (in weight parts) is within a range of from 25/75 to 75/25, or preferably, from 40/60 to 60/40. For resins, the blending ratio (in weight parts) of acrylpolyol to vinyl chloride-vinyl acetate copolymer should be within a range of from 15/3 to 10/6, or preferably, from about 13/4 to 12/5, and the ratio of polyfunctional isocyanate to acrylpolyol should be substantially equal to about 1/10.

An appropriate quantity of the thus prepared primer layer composition is coated onto the support film, and the primer layer is formed through drying and a setting reaction by heating. The primer layer composition, the white layer composition described later and the writability imparting layer composition may be coated by any of the doctor coating method, the extrusion coating method, the slide coating method, the roller coating method and the gravure coating method and the like.

(White Layer)

A white layer b) or b') is formed on the primer layer.

First, the white layer b) will be described.

The composition used for forming the white layer b) contains, as required constituents, polyurethane, polyfunctional isocyanate, and a white pigment.

Because of the low level of curing contraction, thick coating of the white layer composition never causes a curl of the masking material, and it is possible to impart sufficient white concealing property to the background of the writability imparting layer. However, since this white layer composition is low in adhesion, it is necessary to form the white layer on the support film via the primer layer.

Polyurethane is a polymer compound having an urethane bond on the main chain thereof. As a polyurethane resin in the invention, a polyurethane resin usually used as a binder for printing ink is effectively applicable, and no particular restriction is imposed. The number average molecular weight should however preferably be within a range of from 3,000 to 150,000. If the number average molecular weight is under 3,000, the composition using this as a binder is low in drying property and blocking resistance. If it is over 150,000, on the other hand, an increased viscosity of the polyurethane resin solution impairs storage stability of the composition.

As the polyfunctional isocyanate and the white pigment of the white layer composition, the same constituents as those for the primer layer may be used.

The white layer composition is prepared by mixing the aforementioned required constituents, and as required, other constituents. The coating solution for the white layer composition is prepared usually by placing these constituents in a solvent, preferably in a mixed solvent of methylethyl ketone, toluene, and isopropyl alcohol (IPA) and dissolving and dispersing them on a beads mill or the like to impart an appropriate coating property. The constituents of the white layer composition can be mixed, dissolved and dispersed by known methods.

An appropriate quantity of the thus prepared white layer composition is coated onto the primer layer in the same manner as in the case of the primer layer composition, and the white layer b) is formed through drying and a curing reaction by heating.

The white layer b') will now be described.

The composition used for forming the white layer b') contains, as required constituents, polyurethane, acrylpolyol, vinyl chloride-vinyl acetate copolymer, polyfunctional isocyanate and a white pigment.

The white layer b') composition is characterized in that acrylpolyol and vinyl chloride-vinyl acetate copolymer are further contained in addition to the constituents of the white layer b) composition.

The same acrylpolyol as that used for the primer layer may be used. Acrylpolyol, which contains many cross-linking, can be made into a hard product. It is therefore possible to form the white layer 5 to a higher hardness by adding acrylpolyol to the white layer composition. As a result, even when a tension is applied, it is possible to form a white layer b') in which elongation is further inhibited. Acrylpolyol has on the other hand a property of causing a cured product to be more easily subjected to heat shrinkage. Since urethane contained in the white layer composition has a function of alleviating curing contraction and heat shrinkage of a cured product, it is possible to reduce curing contraction and heat shrinkage of the cured product through interaction of acrylpolyol and urethane.

The same vinyl chloride-vinyl acetate copolymer as that used for the primer layer may be used. Containing vinyl chloride-vinyl acetate copolymer permits utilization of compatibility between urethane and acrylpolyol, and inhibition of curing contraction or heat shrinkage.

By forming the masking material by the white layer b') formed from the white layer b') composition, even when a tension is applied to the masking material during the processing step in the manufacture of a photo-film unit, it is possible to suitably apply the masking material to that processing step of the photo-film unit, and inhibit occurrence of a curl while reducing heat shrinkage.

To achieve the aforementioned advantages of the white layer b'), the white layer b') composition should be such that the urethane content is within a range of from 5 to 50 wt. %, or preferably, from 5 to 35 wt. %; the acrylpolyol content is within a range of from 15 to 70 wt. %, or preferably, from 30 to 70 wt. %; and the content of vinyl chloride-vinyl acetate copolymer is within a range of from 15 to 35 wt. %, or preferably, from 15 to 30 wt. %. The term "wt. %" means the ratio of content when the total weight of urethane, acrylpolyol and vinyl chloride-vinyl acetate copolymer is assume to be 100 wt. %.

The weight percentage of urethane to acrylpolyol and vinyl chloride-vinyl acetate copolymer should preferably be within a range of from 5:95 to 50:50, or more preferably, from 5:95 to 35:65. Within this range, curing contraction and heat shrinkage of the cured composition can be inhibited, thus permitting further inhibition of occurrence of curl, reduction of elongation, and hence improvement of adaptability to processing.

For the white layer composition for forming the white layer b') causing only slight curing contraction as in the white layer composition for forming the white layer b). Even a thick coating does not lead to occurrence of curl of the masking material, and it is possible to impart a sufficient white concealing property to the background of the writability imparting layer. However, because this white layer composition is insufficient in adhesion, it should be formed on the support film via the primer layer.

As in the white layer b) described above, the white layer b') is formed by coating an appropriate quantity of the prepared primer layer composition on the primer layer in the same manner as in the primer layer composition, drying the same, and heating the same for curing reaction.

Acrylpolyol and vinyl chloride-vinyl acetate copolymer are mixed both in the white layer b') composition for forming the white layer b') and the primer layer composition. In the white layer and the primer layer formed by these compositions, elongation against tension and contraction upon curing become closer to each other. Therefore, even when a tension is applied to the masking material in the processing step when manufacturing a photo-film unit, it is possible to adaptably apply the masking material to the processing step of the photo-film unit, and further inhibit occurrence of curl by reducing heat shrinkage.

(Writability Imparting Layer)

On the white layer b) or the white layer b') described above, a writability imparting layer comprising vinylpyrrolidone-vinyl acetate copolymer, an acrylic resin having a hydrophilic group, and powder is formed.

The surface of this writability imparting layer exhibits an excellent writability for all writing material usually used such as a ballpoint pen, an oily pen, an aqueous pen, a fountain pen, and pencil. This writability imparting layer is water-resistant, never causes blocking, and even pencil writing can be completely erased by a rubber.

Vinylpyrrolidone-vinyl acetate copolymer is a water absorbing resin, and is blended into the writability imparting layer for the purpose of permitting satisfactory writability when using an aqueous writing material such as an aqueous pen or a fountain pen, without causing blurs or graze. No particular restriction is imposed on the copolymerization ratio and the number average molecular weight of vinylpyrrolidone and vinyl acetate copolymer used in the invention. They are appropriately selected, for the copolymerization ratio, within a range of from 90/10 to 10/90, or preferably, from 70/30 to 30/70, and for the number average molecular weight, within a range of from 10,000 to 100,000, or preferably, from 30,000 to 70,000.

The acrylic resin having a hydrophilic group is added to the writability imparting layer to impart water resistance, but does not impair water absorbing property of vinylpyrrolidone-vinyl acetate copolymer. A specific example of the acrylic resin having a hydrophilic group is an acrylic resin having an amino group and a hydroxide group and has methylmetacrylate as a main monomer unit. Other typical examples include polymers such as hydroxyethylacrylate, hydroxyethylmetacrylate, hydroxypropylacrylate, hydroxypropylmetacrylate, trimethylolpropanemonoacrylate, trimethylolpropanemonometacrylate, pentaerythritolmonoacrylate, pentaerythritolmonometacrylate, methylaminoethylacrylate, methylaminoethylmetacrylate, dimethylaminoethylacrylate, dimethylaminoethylmetacrylate, acrylamide, metacrylamide, monomethylolacrylamide, and monomethylolmetacrylamide, and copolymers containing any of the above. It is possible to further improve water resistance, heat resistance and hardness of the coating film by causing cross-linking or curing of the amino group or the hydroxide group by means of a cross-linking agent or a curing agent.

The powder is added to the writability imparting layer for the purpose of improving writability for pencil or ballpoint pen. The powder should preferably have an average particle size within a range of from 1 to 10 $\mu$m, or more preferably, from 1.5 to 5 $\mu$m. The average particle size of powder can be measured by the laser analysis scattering method. With a rough particle size of the powder, resistance of the writing surface becomes higher, resulting in a poor writing feeling, and an excessively fine particle size of powder leads to an insufficient resistance of the writing surface, and a satisfactory writing density is unavailable. When the powder melts and deforms in the heating process for curing the primer layer or the white layer or in a high-temperature environment, addition of the powder cannot give a desired pencil writability. The powder for imparting pencil writability should preferably be a powder comprising an organic or inorganic material which never melts in an anticipated high-temperature environment. Applicable materials for powder include high-melting-point polymer beads, silica, talc, calcium carbonate and alumina.

In addition, a powder can also be used as a slippery imparting agent in order to take smoothly each photo film unit out of a cartridge containing them one by one. For that purpose, such powdery materials as polytetrafluoroethylene beads and polymer beads of cross-linked poly(meth)acryl, polystyrene, or nylon, having a particle size of 1 to 20 $\mu$m, preferably 2 to 10 $\mu$m, can be used.

The writability imparting layer composition is prepared by mixing, as required constituents, vinylpyrrolidone-vinyl acetate copolymer, an acrylic resin having a hydrophilic group, and the powder described above, and as required, other constituents. The coating solution of the writability imparting layer composition is usually prepared by placing these constituents into a solvent, or preferably, into isopropylalcohol (IPA), dissolving and dispersing the same, to impart an appropriate coating property. The constituents of the writability imparting layer composition can be mixed, dissolved, and dispersed by any of the known methods. There is no particular restriction imposed on the blending ratios of vinylpyrrolidone, hydrophilic acrylic resin and powder. It is, however, recommendable to use the vinylpyrrolidone-vinyl acetate copolymer in an amount of 5 to 50 weight %, preferably, 10 to 40 weight %; the acrylic resin having a hydrophilic group in an amount of 20 to 90 weight %, preferably, 30 to 60 weight %; the powder as writability improving agent in an amount of 2 to 50 weight %, preferably, 3 to 35 weight %; and the powder as slippery imparting agent, if necessary, in an amount of not less than 2 weight %, preferably, not less than 3 weight %. Although there is no restriction for the upper limit of use of the powder as slippery imparting agent, it is preferable to use it up to 30 weight %

An appropriate quantity of the thus prepared writability imparting layer composition is coated onto the white layer in the same manner as in the primer layer composition, and drying the same, thereby forming the writability imparting layer.

(Printing Layer)

A printing layer on a portion which is turned down upon manufacture of the photo-film unit using the masking material of the invention and serves to cover the back side of the photo-film unit may be provided on the surface side of the masking material. The product name and other indication may be presented on the printing layer.

Further, the surface of the printing layer should preferably be slippery relative to the surface side of the photo-film unit. The surface side of the photo-film unit comprises an image portion on which a protective film forms an outermost surface, and a non-image portion surrounding the image portion. At least an area of the non-image portion is occupied by the writable area of the masking material. By providing a printing layer slippery relative to the image portion and the non-image portion on the surface side on the back side of the photo-film unit having such a configuration, piling of photo-film units does not cause blocking. It is therefore possible to take out photo-film units one by one smoothly from the photo-film unit cartridge.

(Hot Lacquer Layer)

Heat sealing property and adhesivity such as pressure-sensitive adhesion may be imparted to the back side of the masking material of the invention so as to ensure convenience in covering the photo-film unit with the masking material. A heat sealing hot lacquer layer should preferably be provided in a coating weight within a range of from 12 to 14 $g/m^2$ (solid content).

(Manufacture of Masking Material)

The masking material can be manufactured by sequentially forming the aforementioned layers on the support film. The primer layer and the white layer should be cured through heating or the like after drying the coated film of the primer layer composition or the white layer composition. A coating layer of the primer layer composition and a coating layer of the white layer composition may be simultaneously cured after sequentially forming a coating layer of the primer layer composition, a coating layer of the white layer composition, and a coating layer of the writability imparting layer on the support film.

(2) Photo-film Unit

The photo-film unit provided by the present invention has, as an outermost surface layer, a writability imparting layer comprising vinylpyrrolidone-vinyl acetate copolymer, an acrylic resin having a hydrophilic group, and powder on the support surface of the non-image portion.

a) A primer layer comprising a primer layer composition containing acrylpolyol, vinyl chloride-vinyl acetate copolymer, polyfunctional isocyanate and a white pigment, b) a white layer comprising a white layer composition containing urethane, polyfunctional isocyanate and a white pigment, and c) the writability imparting layer as an outermost surface layer should preferably be sequentially laminated on the support surface. Any other layer may be provided so far as it is not contrary to the object of the invention.

a) A primer layer comprising a primer layer composition containing acrylpolyol, vinyl chloride-vinyl acetate copolymer, polyfunctional isocyanate, and a white pigment, b') a white layer comprising a white layer composition containing urethane, acrylpolyol, vinyl chloride-vinyl acetate copolymer, functional isocyanate and a white pigment, and c) the writability imparting layer serving as an outermost surface layer should preferably be sequentially laminated on the support surface. Any other layer may be provided so far as it is not contrary to the object of the invention.

The term "photo-film unit" means a photo-film having an image portion and a non-image portion on one side of a support such as a plastic film or a sheet of paper having a plastic film surface, such as a color photo print, a monochromatic photo print, a color slide, and a self-processing type photo-film unit based on dispersing transferability.

The photo-film unit of the invention may be manufactured by forming the above-mentioned primer layer, white layer and writability imparting layer in this sequence on a support of the non-image portion. It is manufacturable also by covering the photo-film unit with a masking material of the invention.

Figure 3:
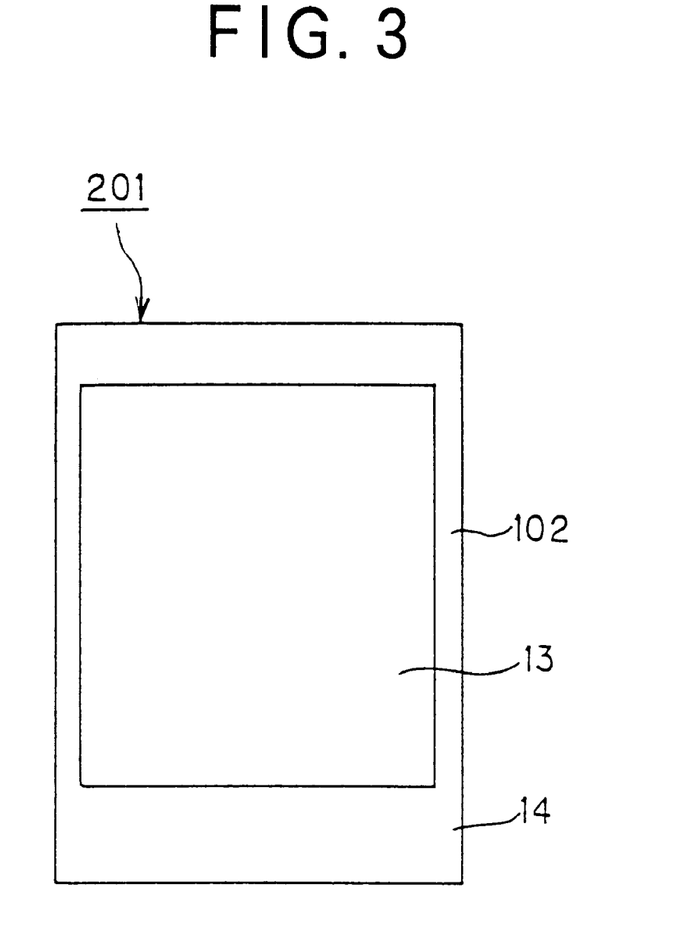
FIG. 3 is a plan view illustrating an example of the photo-film unit of the invention.
Figure 4:
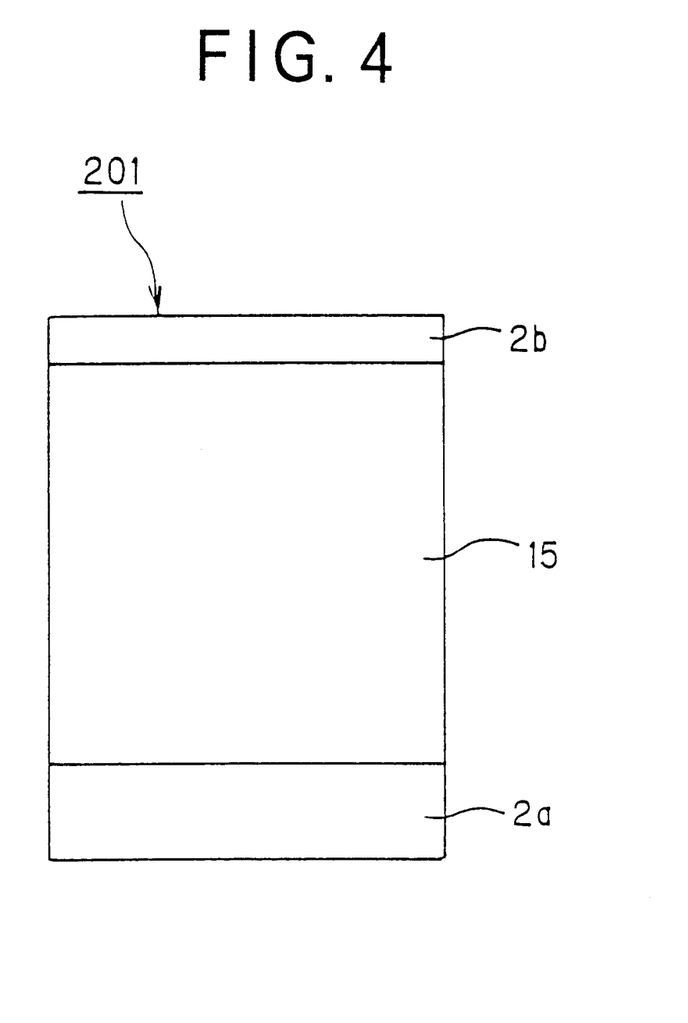
FIG. 4 is a bottom view illustrating an example of the photo-film unit of the invention.
Figure 5:
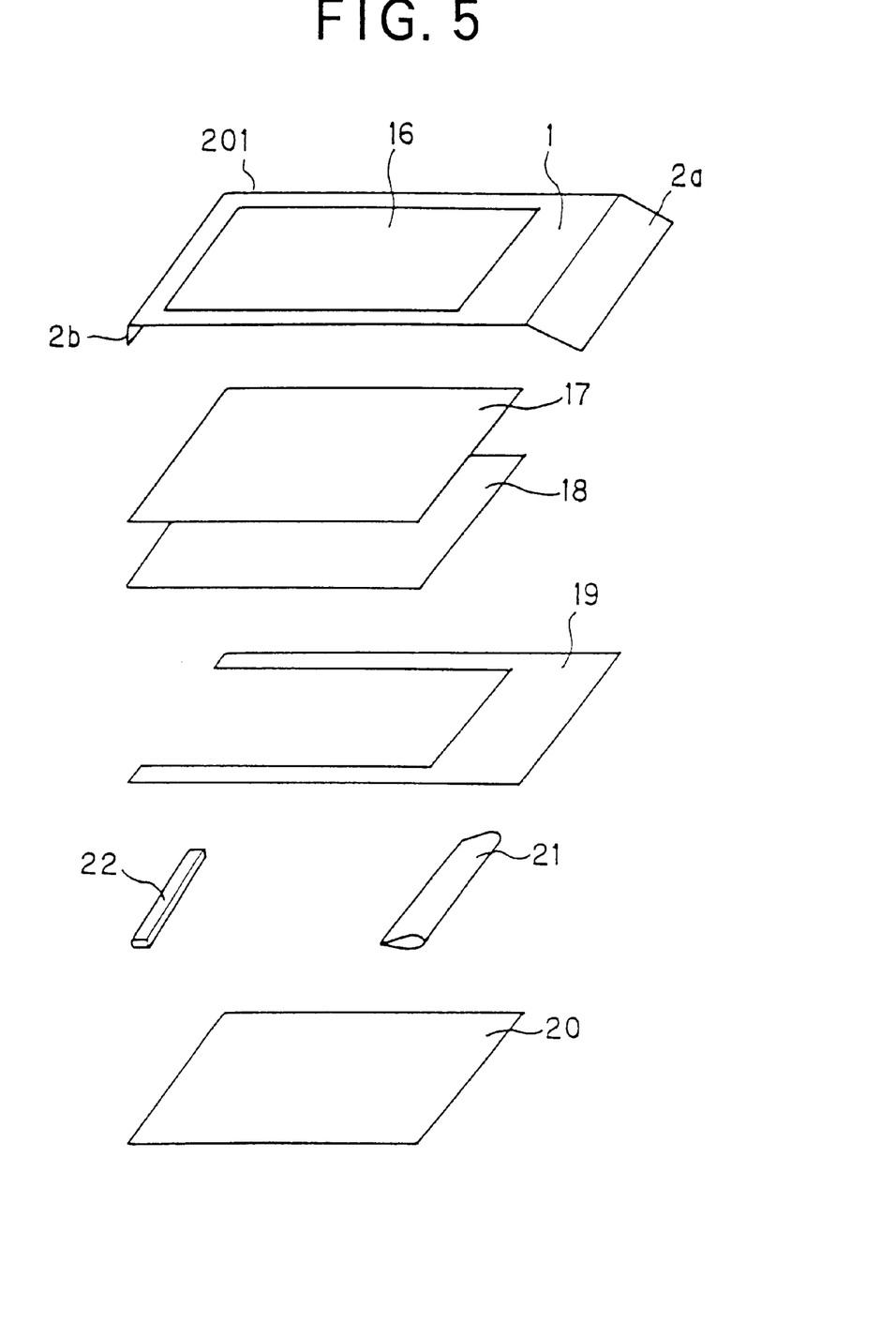
FIG. 5 is an exploded view illustrating an example of the photo-film unit of the invention.
Figure 6:
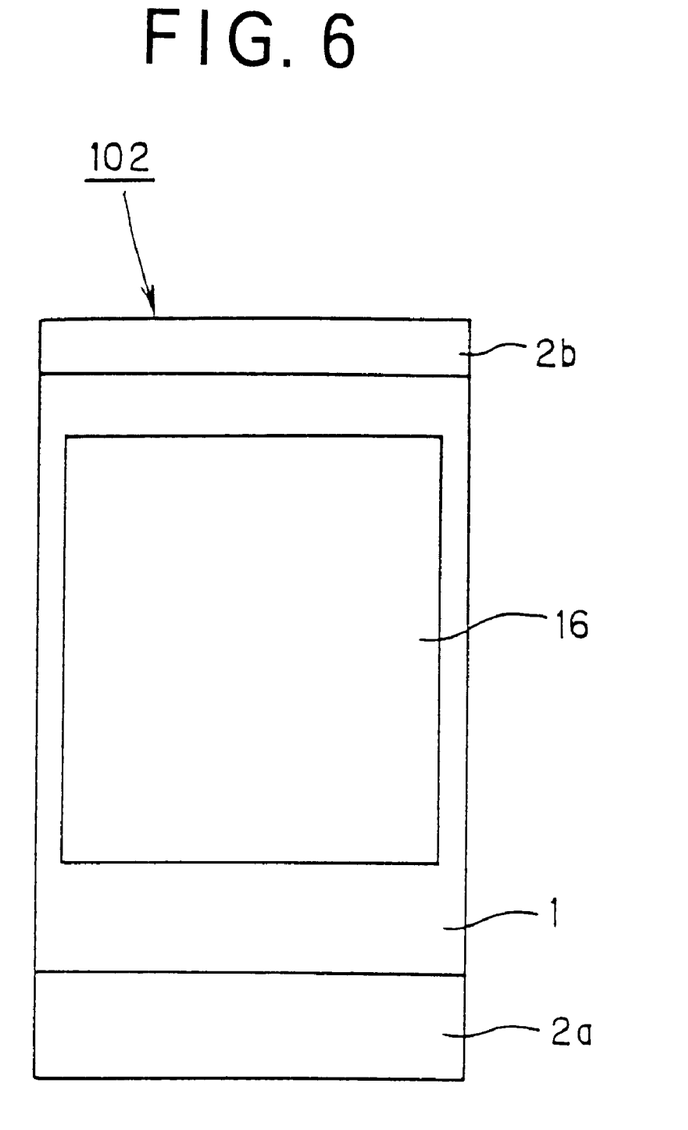
FIG. 6 is a plan view illustrating an example of the masking material cut in a prescribed shape for use in the photo-film unit of the invention.

FIGS. 3 to 5 illustrate an example (201) of monosheet type instant photo-film unit manufactured by using the masking material 101 of the invention. A masking member 102 obtained by cutting the masking material 101 for covering the film unit 201 is shown in FIG. 6.

FIG. 3 is a plan view. Most part of the surface side of the film unit 201 is occupied by the image portion 13 covered with a protective film. The peripheral portion is a frame comprising the non-image portion 14, and covered by the portion of the writable area of the masking material 102. In the non-image portion 14, the part under the image portion 13 accounts for a relatively large area to facilitate writing of characters and the like.

FIG. 4 is a bottom view. The back side of the film unit 201 is lined with a bail film, and the upper side thereof is covered with a narrow printing section 2b of the masking material 102 going round from the surface side of the film unit 201, and the under side is covered with a wide printing section 2a of the masking material 102 going round from the surface side of the film unit 201.

FIG. 5 is an exploded view illustrating the structure of the film unit 201. In order to manufacture this film unit, a masking material 102 is prepared by cutting a long-sheet-shaped masking material 101 into a frame having a window 16 as shown in FIG. 6. A rail member 19, a sensitive layer 18 and a protective film 17 are laminated in this sequence on a base film 20, and a pod member 21 filled with developing solution is arranged at the lower end of the image portion. An absorbing material 22 absorbing an excess fraction of the developing solution released from the pod member is arranged at the upper end of the image portion. A film unit 201 is obtained by covering the protective film with the masking material 102, turning down the upper and lower ends to turn the printing sections 2a and 2b to the back side, and heat-sealing the peripheral portion.

When a plurality of film units 201 are housed in a cartridge one on top of the other and set in a camera, the wide printing layer 2a covering the lower end of the back side of the film unit located at the top in the cartridge faces and comes into contact with the non-image portion 14 having a relatively large area covering the lower end of the surface side of the second film unit. The printing layer 2a is slippery relative to the writability imparting layer forming the outermost surface layer of the non-image portion 14. It is therefore possible to take out the first film unit smoothly without causing blocking.

Writing is possible by any of a ballpoint pen, an oily pen, an aqueous pen, a fountain pen and a pencil without blurs or a graze on the non-image portion of the film unit 201 discharged from the camera and for which developing has been completed. A pencil-written line can be completely erased with a rubber. Furthermore, in spite of satisfactory writability with an aqueous pen, the non-image portion is excellent in water resistance.

EXAMPLES

Example 1

(Writability Imparting Layer Composition)

50% ethanol solution of vinylpyrrolidone-vinyl acetate copolymer, 24 weight parts; 25% solution of cationic acrylic resin having hydrophilic group, 48 weight parts; microsilica (particle size: 4.1 μm), 6 weight parts; and isopropylalcohol, 22 weight parts.

A writability imparting layer composition was prepared by sufficiently kneading these constituents. Then, the thus prepared resin composition was coated by the gravure coating method onto one side of a biaxial-oriented polyethylene terephthalate (PET) film having a thickness of 25 μm followed by drying. After drying, a writability imparting layer having a thickness of about 2 μm was formed, thereby manufacturing a photo-film unit masking material of the invention.

The resultant photo-film unit masking material was satisfactory in ink receptibility, drying property, fixability and water resistance, and permitted very clear writing of characters, symbols, pictures and graphics by means of a ballpoint pen, an oily pen, an aqueous pen, a fountain pen, a pencil and other writing materials. There was available a good fixability of ink after writing. Writing on the writability imparting layer with a pencil could easily been erased with a rubber.

Example 2

(Primer Layer Composition)

Acrylpolyol, 11.00 weight parts; vinyl chloride-vinyl acetate copolymer, 5.75 weight parts; cellulose butyrate-acetate, 0.85 weight parts; polyethylene wax, 1.50 weight parts; microsilica, 1.00 weight parts; titanium oxide, 30.00 weight parts; polyfunctional isocyanate, 7 weight parts; methylethyl ketone, 19.20 weight parts; and ethyl acetate, 11.60 weight parts.

(White Layer Composition)

Urethane resin, 10.80 weight parts; titanium oxide, 30.00 weight parts; polyfunctional isocyanate, 5 weight parts; fatty acid amide, 0.10 weight parts; surfactant, 0.20 weight parts; methylethyl ketone, 25.70 weight parts; toluene, 27.00 weight parts; and ilsopropylalcohol, 6.20 weight parts.

A primer layer composition and a white layer composition were prepared by sufficiently kneading the constituents listed above. Then, a biaxially oriented PET film (1) having a thickness of 12 μm and a vapor deposited PET film (2) having a thickness of 12 μm comprising a biaxially oriented PET film having a metal vapor deposited layer on one side thereof were affixed together via an adhesive layer with the vapor deposited layer surface of the vapor deposited PET film inside, thereby preparing a composite film.

A primer layer was formed by coating the primer layer composition on the surface of the biaxially oriented PET film (1) of the above-mentioned composite film so that the thickness after drying was about 1 μm. A white layer was formed by coating the white layer composition on the thus formed primer layer so as to achieve a thickness after drying of about 8 μm. A writability imparting layer was formed by coating the same writability imparting layer composition as that prepared in Example 1 on the thus formed white layer so as to give a thickness after drying of about 2 μm. A photo-film unit masking material was thus manufactured.

The resultant photo-film unit masking material was satisfactory in ink receptibility, drying property, fixability and water resistance, and permitted very clear writing of characters, symbols, pictures and graphics with various writing materials such as a ballpoint pen, a oily pen, an aqueous pen, a fountain pen and a pencil. Ink fixability after writing was satisfactory. Writing with a pencil on the writability imparting layer could easily be erased with a rubber.

Comparative Example 1

A photo-film unit masking material was manufactured by coating the same primer layer composition as that prepared in Example 2 on a side of a biaxially oriented polyethylene terephthalate film having a thickness of 25 μm by the gravure coating method so that the thickness after drying was about 8 μm.

The resultant photo-film unit masking material posed no problem in writing with a pencil, a ballpoint pen, and an oily pen. However, because of poor ink receptibility and fixability, writing with an aqueous pen and a fountain pen led to a state in which the ink was repelled on the surface, making it difficult to write and fix. The thick coating of the primer layer composition caused occurrence of a curl in the photo-film unit masking material.

Comparative Example 2

A biaxially oriented PET film (1) having a thickness of 12 μm and a vapor deposited PET film (2) having a thickness of 12 μm prepared by providing a metal vapor deposited layer on a side of the biaxially oriented PET film were affixed together via an adhesive layer with the vapor deposited layer surface of the vapor deposited PET film inside to prepare a composite. film. A primer layer of the same coating weight was formed on the surface of the biaxially oriented PET film (1) of the resultant composite film (1) by using the same primer layer composition as in Example 2, and a white layer of the same coating weight was formed on the thus formed primer layer by using the same white layer composition as in Example 2, thereby manufacturing a photo-film unit masking material.

The resultant photo-film unit masking material, in which a writability imparting layer was not laminated as an outermost surface layer, showed a satisfactory writability for pencil, ballpoint pen and oily pen. It was not however ink-receptible for aqueous ink for an aqueous pen or a fountain pen: repellence occurred and rubbing after writing resulted in blots of ink.

Example 3

A photo-film unit masking material was manufactured in the same manner as in Example 2 except that the white layer composition in Example 2 was replaced by the following white layer composition:

(White Layer Composition)

Urethane resin, 2.50 weight parts; acrylpolyol, 7.50 weight parts; vinyl chloride-vinyl acetate copolymer, 5.00 weight parts; titanium oxide, 30.00 weight parts; polyfunctional isocyanate, 3.75 weight parts; fatty acid amide, 0.10 weight parts; surfactant, 0.20 weight parts; methylethyl ketone, 25.70 weight parts; toluene, 27.00 weight parts; and isopropylalcohol, 6.20 weight parts.

The thus obtained photo-film unit masking material as well displayed a writability similar to that obtained in the masking material in Example 2.

The photo-film unit masking material using the above-mentioned white layer did not exhibit elongation upon stretching, and was therefore more suitable for processing than the masking material obtained in Example 2.

Example 4

A photo-film unit masking material was manufactured in the same manner as in Example 3 except that the blending ratios of urethane, acrylpolyol and vinyl chloride-vinyl acetate copolymer in the white layer composition in Example 3 were changed as follows:

Urethane resin, 5.00 weight parts; acrylpolyol, 6.50 weight parts; and vinyl chloride-vinyl acetate copolymer, 3.50 weight parts.

The resultant photo-film unit masking material as well displayed a writability similar to that of the masking material in Example 3.

Example 5

A photo-film unit masking material was manufactured in the same manner as in Example 3 except that the blending ratios of urethane, acrylpolyol and vinyl chloride-vinyl acetate copolymer in the white layer composition in Example 3 were changed as follows:

Urethane, 7.50 weight parts; acrylpolyol, 2.50 weight parts; and vinyl chloride-vinyl acetate copolymer, 5.00 weight parts.

The photo-film unit masking material as well displayed a writability similar to that of the masking material in Example 3.

(Evaluation of Elongation and Processing Adaptability and Result)

The elongation was measured on the white layers formed in Examples 2 to 5 and the primer layer formed in Comparative Example 1. Measurement was carried out by forming white layers and a primer layer by coating the white layer composition of Examples 2 to 5 and the primer layer composition of Comparative Example 1 by using an applicator onto stripping sheets of paper and curing through aging at 40 C for three days, and measuring the thickness of these layers with a micrometer. Each layer was cut into a width of 10 mm and a length of 5 mm, and elongation was measured by a tensile tester at a tensile rate of 50 mm/min. An elongation is a value obtained by dividing a measured elongation value by the layer thickness. The result is shown in Table 1.

The processing adaptability was evaluated by observing occurrence of a defective tension on a processing machine when subjecting the photo-film unit masking materials prepared in Examples 2 to 5 and Comparative Example 1 to the manufacturing process of photo-film units. More specifically, the running direction of the processing machine line was assumed to be X, the occurrence of a phenomenon in which the masking material was deviated in the Y direction perpendicular to the X direction was deemed to be a defective tension. The evaluation of processing adaptability shown in Table 1 was classified into "n very good" representing an excellent processing adaptability relative to the applied tension, and "good" representing a case showing a slightly inferior processing adaptability relative to the applied tension but posing no practical problem.

TABLE 1

|  | Elongation (mm/μm) | Processing adaptability | Occurrence of curl |
|---|---|---|---|
| Example 2 | 1.1 | good | None |
| Example 3 | 0.1 | very good | None |
| Example 4 | 0.2 | very good | None |
| Example 5 | 0.5 | good | None |
| Comp.Ex.1 | 0.05 | very good | Yes |

Example 6

A photo-film unit masking material was manufactured in the same manner as in Example 1 except that polytetrafluoroethylene beads having a particle size of 4 μm was added to the writability imparting layer composition in Example 1. The thus obtained photo-film unit masking material as well displayed a writability similar to that obtained in the masking material in Example 1.

Example 7

A photo-film unit masking material was manufactured in the same manner as in Example 3 except that the writability imparting layer composition in Example 3 was replaced by the writability imparting layer composition in Example 6. The thus obtained photo-film unit masking material as well displayed a writability similar to that obtained in the masking material in Example 6.

According to the present invention, as described above in detail, there is provided a photo-film unit masking material which is water-resistant, exhibits an excellent writability for all the usually used writing materials such as a ballpoint pen, an oily pen, an aqueous pen, a fountain pen and a pencil, and permits complete erasure of even pencil writing with a rubber.

A photo-film unit which is water-resistant, exhibits an excellent writability for all the usually used writing materials such as a ballpoint pen, an oily pen, an aqueous pen, a fountain pen and a pencil, and permits complete erasure of pencil writing with a rubber, without the risk of blocking, by covering a photo-film unit such as a monosheet type instant photo-film unit, a color photo print, a monochromatic photo print, or a color slide with the masking material of the invention, or by directly forming a writable area similar to that provided in the aforementioned masking material on the non-image portion of the photo-film unit.

When using a white layer formed by a white layer composition containing acrylpolyol and vinyl chloride-vinyl acetate copolymer in the present invention, it is possible to provide a photo-film unit masking material and a photo-film unit which solves product elongation caused by applied tension upon processing the product, and are excellent in processing adaptability.

The entire disclosure of Japanese Patent Applications No. 2000-253791 filed on Aug. 24, 2000 and No. 2001-152305 filed on May 22, 2001 including the specifications, claims, drawings and summary are incorporated herein by reference in its entirety.

What is claimed is:

1. A masking material for a photo-film unit having a writability imparting layer comprising vinylpyrrolidone-vinyl acetate copolymer, an acryl resin having a hydrophilic group, and a powder as an outermost surface layer formed on a support film.

2. The masking material for a photo-film according to claim 1, having at least a writability imparting layer as an outermost surface layer formed via a primer layer and a white layer, laminated on said support film.

3. The masking material for a photo-film according to claim 2, wherein said primer layer comprises a hardened composition containing acrylpolyol, vinyl chloride-vinyl acetate copolymer, polyfunctional isocyanate, and a white pigment.

4. The masking material for a photo-film according to claim 2, wherein said white layer comprises a hardened white layer composition containing urethane, polyfunctional isocyanate and a white pigment.

5. A photo-film unit having a photo-film unit masking material comprising a writability imparting layer comprising vinylpyrrolidone-vinyl acetate copolymer, an acryl resin having a hydrophilic group, and a powder as an outermost surface layer formed on a support film, provided on a non-image portion in the same plane as the image portion of said photo-film unit.

6. The photo-film unit having the photo-film unit masking material according to claim 5, wherein the masking material for a photo-film comprises at least a writability imparting layer as an outermost surface layer formed via a primer layer and a white layer, laminated on said support film.

7. The photo-film unit having the photo-film unit masking material according to claim 5, wherein said primer layer comprises a hardened composition containing acrylpolyol, vinyl chloride-vinyl acetate copolymer, polyfunctional isocyanate, and a white pigment.

8. The photo-film unit having the photo-film unit masking material according to claim 5, wherein said white layer comprises a hardened white layer composition containing urethane, polyfunctional isocyanate and a white pigment.

* * * * *